United States Patent [19]

Elslager et al.

[11] 3,904,631
[45] Sept. 9, 1975

[54] NOVEL THIOXANTHENONE COMPOUNDS AND MEANS OF PRODUCING THE SAME

[75] Inventors: Edward F. Elslager; Donald F. Worth, both of Ann Arbor, Mich.

[73] Assignee: Parke, Davis & Company, Detroit, Mich.

[22] Filed: May 29, 1973

[21] Appl. No.: 364,699

[52] U.S. Cl. ............. 260/268 TR; 195/29; 424/250
[51] Int. Cl.² ............... C07D 295/10; C07D 295/22
[58] Field of Search ...................... 260/268 TR, 328

[56] References Cited
UNITED STATES PATENTS

| | | | |
|---|---|---|---|
| 2,656,357 | 10/1953 | Kushner | 260/268 TR |
| 3,047,579 | 7/1962 | Witman | 260/289 |
| 3,294,803 | 12/1966 | Rosi et al. | 260/328 |

OTHER PUBLICATIONS

Hartman et al., Science, Vol. 17, pp. 1058–1060, (1971).
Hulbert, Science, Vol. 186, pp. 647–648, (1974).
Prakash et al., 6th Rochester Conference on Environmental Toxicity, (1974), pp. 73–91.
Blanz Jr. et al., J. Med. Chem., Vol. 6, pages 185–191, (1963).
Rhone-Poulenc Chemical Abstracts, Vol. 60, 10699e, (1964).
Mikio Hori et al., Chemical Abstracts, Vol. 73, 87796t, (1970).

*Primary Examiner*—Raymond V. Rush
*Assistant Examiner*—Jose Tovar

[57] ABSTRACT

6-Chloro-1-(4-methyl-1-piperazinyl)thioxanthen-9-ones (I)

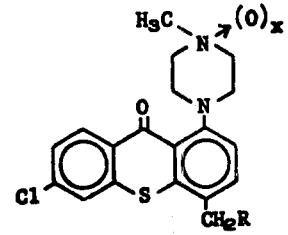

where R is H or OH and $x$ is zero or one are prepared by reacting N-methylpiperazine with 1,6-dichloro-4-methylthioxanthen-9-one; by oxidative fermentation of the product of where R is H and $x$ is zero; and by N-oxidation of the products where $x$ is zero. The products have antiparasitic properties and are pharmacological agents for topical, oral or parenteral use.

7 Claims, No Drawings

NOVEL THIOXANTHENONE COMPOUNDS AND MEANS OF PRODUCING THE SAME

SUMMARY AND DETAILED DESCRIPTION

This invention relates to novel thioxanthenone compounds and to means for producing the same. More particularly, the invention relates to 6-chloro-1-(4-methyl-1-piperazinyl)thioxanthen-9-ones and their acid salts, having in free base form the formula

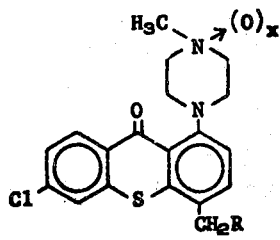

and to means for producing the same; where R is H or OH and $x$ is zero or one.

According to the invention 6-chloro-4-methyl-1-(4-methyl-1-piperazinyl)thioxanthen-9-one compounds (I, R is H, $x$ is zero) are prepared by reacting N-methylpiperazine with 1,6-dichloro-4-methylthioxanthen-9-one in the presence of base and isolating the product as the free base or optionally as the acid addition salt obtained by reacting the free base with an acid. The conditions for the reaction may be varied widely and are not critical. In particular, the combining proportions of the reactants may be varied using, for example, equimolar amounts or an excess of either of the reactants. The use of an excess of N-methylpiperazine is preferred. As a base for the reaction any of the various organic and inorganic bases are suitable. Potassium carbonate is a preferred base. The reaction is ordinarily carried out in an organic solvent such as xylene, toluene, pyridine, dimethylformamide, and diphenyl. Xylene, toluene and pyridine are preferred solvents for the reaction. The reaction is carried out at temperatures within the range of about 100° to 150° C. At these temperatures the reaction is complete within periods ranging up to about 24 hours.

Also according to the invention, 6-chloro-1-(4-methyl-1-piperazinyl)thioxanthen-9-one compounds of formula I where $x$ is one are prepared by oxidizing the corresponding compounds of formula I where $x$ is zero with hydrogen peroxide or a peracid, and isolating the product as the free base or optionally as the acid addition salt obtained by reacting the free base with an acid. The reaction conditions are subject to considerable variation and are not critical. In particular, the combining proportion of the reactants may be varied, preferably using with the thioxanthenone reactant, an equimolar amount of the peracid or an excess of hydrogen peroxide. Any of a number of peracids can be used for the reaction such as m-chloro-perbenzoic acid, perphthalic and perbenzoic acids. A solvent which is inert in the reaction is employed such as acetone or chloroform. The reaction is ordinarily carried out at room temperature using a peracid oxidizing agent and at higher temperature up to about 75° C. using hydrogen peroxide. Under these conditions the reaction is ordinarily complete within periods ranging up to 15 to 18 hours. The course of the reaction can be readily followed using thin layer chromatography.

Further according to the invention, 6-chloro-1-(4-methyl-1-piperazinyl)thioxanthen-9-one compounds of formula I where R is OH are prepared by subjecting a corresponding product of formula I where R is H to microbiological conversion and isolating the product as the free base or optionally as the acid addition salt obtained by reacting the free base with an acid. According to this method, the thioxanthenone starting material or substrate is incorporated with a microorganism in a suitable growth medium under fermentation conditions sufficient to cause the conversion of the 4-methyl-thioxanthenone starting material to the corresponding 4-hydroxymethylthioxanthenone. For this fermentation any of various microorganisms can be employed which, as determined by a routine screening procedure, have the ability to oxidize the methyl group in the way indicated. Specific examples of microorganisms applicable to oxidative fermentation are those from the orders Moniliales, Mucorales and Sphaeriales, as follows: *Aspergillus flavipes*, *Aspergillus niger* and *Aspergillus sclerotiorum* of the order Moniliales; *Mucor griseo-cyanus*, *Mucor parasiticus*, *Syncephalis nodosa* and *Thamnidium elegans* of the order Mucorales; and *Chaetomium globosum*, *Chaetomium nigricolor* and *Didymella lycopersici* of the order Sphaeriales. Samples of the mentioned microorganisms are publicly available from recognized institutional culture collections such as the American Type Culture Collection. A preferred microorganism for the present invention is *Aspergillus sclerotiorum*, especially *A. sclerotiorum* available from the Imperial Mycological Institute as No. 56673.

Cultivation of the microorganism is accordance with the invention is carried out in an aqueous nutrient medium. The composition of the medium is determined by general considerations in the fermentation art which per se are well-known and includes an organic carbon source and a source of organic nitrogen. Optionally, the medium includes an inorganic nitrogen source and added growth factors, mineral salts and trace minerals. For purposes of illustration, starch, corn meal, sugars or glycerol represent suitable organic carbon sources. The organic nitrogen can be provided by any convenient source such as casein, soybean meal, peanut meal, cotton seed meal, wheat gluten, barley or oat tailings, lactalbumin, enzymatic digest of casein, tryptone, and meal peptone. A suitable inorganic nitrogen source is ammonium chloride or ammonium sulfate. Growth factor may be provided by distiller's solubles, yeast autolysate, yeast extract or molasses fermentation residues. Illustrative mineral salts are sodium chloride, potassium sulfate and magnesium sulfate. Copper, cobalt, manganese, iron and zinc are examples of trace minerals. For the control of foaming during the fermentation, an anti-foaming agent may be employed such as a polyglycol, silicone, lard oil, mineral oil, vegetable oil, or a higher alkanol anti-foaming agent.

The fermentation is conveniently carried out in successive stages: 1) preparation of slant cultures, 2) seed stage, 3) pre-conversion stage, and 4) conversion stage. The first three stages concern the preparation of the microorganism and fermentation medium in sizable quantity. At the conversion stage the thioxanthenone starting material is incorporated with the inoculated growth medium, and the fermentation is carried out for a period sufficient to result in the microbiological conversion of the substrate to the desired final product. The fermentation conditions such as pH, temperature, aeration, harvest, etc. are subject to considerable variation. The initial pH of the medium suitably is in the range from 5.5 to 7.5. The optimum pH is 6.4. If desired, a buffering agent such as calcium carbonate may be incorporated in the medium. The initial concentration of the thioxanthenone substrate in the fermentation medium can be varied, for example, from about 0.1 to 5 mg./ml. or higher, the optimum amount being about one mg./ml. The thioxanthenone can be incorporated in the fermentation medium in any suitable way, for example, as the free base, as the methanolic solution of the free base, or preferably as an aqueous solution of a salt of the free base. Temperatures ranging from about 20°–40° C. may be used. The preferred temperature for the fermentation is 30° C. at which temperature the conversion is complete in about 24 hours. During the fermentation the mixture is agitated and aerated. Aeration is preferably maintained at the rate of about ½ volume per volume of fermentation medium per minute (v.v.m). Agitation is accomplished by conventional means, for example, by stirring with impellers at the rate of about 200 rpm during the pre-conversion stage and about 240 rpm during conversion. The rate of conversion can be conveniently followed by sampling and analyzing the samples during the course of the conversion. The samples obtained are extracted and the extracts analyzed by thin layer chromatography. For the isolation of the product the fermentation mixture is filtered and the resulting filtrate and the mycelium cake are separately extracted with a suitable organic solvent such as methylene chloride. The 4-hydroxymethylthioxanthenone product is isolated in crystalline form from the extracts.

The free base compounds of the invention form acid addition salts upon reaction with organic and inorganic acids. Some examples of the acid addition salts of the invention are the inorganic acid salts such as the hydrochloride, hydrobromide, hydroiodide, sulfate and phosphate and organic acid salts such as the carbonate, succinate, benzoate, acetate, citrate, malate, maleate, p-toluenesulfonate, gluconate, benzenesulfonate and sulfamate, as well as salts with dibasic acids such as methylenebis-(hydroxynaphthoic acid). The acid addition salts are conveniently formed by constituting the free base with an equivalent amount of the acid in a solvent in which the salt is poorly soluble, particularly after chilling, thereby permitting recovery of the desired salt as a solid phase. The invention contemplates the acid salts broadly. In general, the choice of anion is not critical since the cation constitutes the active moiety. The selection and provision of salts for the purposes of the invention will be understood by those skilled in the art in accordance with general methods and considerations which per se will be known to them. Those salts which are unsuited to particular uses, as for example uses where toxicity is a problem, are nevertheless useful as intermediates, being readily convertible to nontoxic acid salts by means which per se are known to those in the art. Whereas both the free base and salt forms of the products are useful to the purposes of the invention, the salts, especially with inorganic acids, are generally preferred in those cases where increased water solubility is desired.

The compounds of the invention are useful as pharmacological agents. The compounds in particular possess schistosomicidal activity and are useful as anti-schistosomal agents for administration orally or parenterally. The compound 6-chloro-4-methyl-1-(4-methyl-1-piperazinyl)-thioxanthenone, for example, shows good activity when administered in standard tests in the mouse in the diet at a dose of 366 mg./Kg. and parenterally at a dose of 160 mg./Kg. intramuscular. The therapeutic index is relatively high for this compound, and the same desirably is not mutagenic, it has been determined, for T-4 bacteriophage growing in *E. coli* when tested at a concentration of 20 micrograms per ml., the highest concentration that was not toxic to phage growth. In spot test (cf. *Science*, 172, 1058) with Salmonella strains, the compound produces no detectable increase in reversion frequency with base-substitution missense mutants, base-substituted nonsense mutants or frameshift mutants.

The invention is illustrated by the following examples.

EXAMPLE 1

A mixture of 11.1 g. of 1,6-dichloro-4-methylthioxanthen-9-one, 6.0 g. of N-methylpiperazine, and 5.5 g. of potassium carbonate in 100 ml. of xylene is stirred and heated under reflux for 21 hours. The resulting orange mixture is filtered while hot. Upon chilling, the filtrate produces crystals which are collected by filtration. Recrystallization from 200 ml. of 1 N hydrochloric acid (charcoal) gives 6-chloro-4-methyl-1-(4-methyl-1-piperazinyl)thioxanthen-9-one, dihydrochloride, sesquihydrate as pale yellow crystals; m.p. indefinite >225° C. (dec.).

A 9.8 g. sample of this material is dissolved in warm water and poured into excess aqueous sodium hydroxide with cooling. The mixture is extracted three times with chloroform. The chloroform extracts are dried over potassium carbonate, and concentrated to dryness under reduced pressure. Recrystallization from ethyl acetate gives 6-chloro-4-methyl-1-(4-methyl-1-piperazinyl)thioxanthen-9-one as the anhydrous base; m.p. 192°–194° C.

A 0.36 g. sample of the base of 6-chloro-4-methyl-1-(4-methyl-1-piperazinyl)thioxanthen-9-one and 0.10 g. of methanesulfonic acid are dissolved in 10 ml. of warm ethanol. Ether is added until crystallization begins. The mixture is chilled and the precipitate is collected to obtain the desired monomethanesulfonic acid salt, hemihydrate; m.p. 224°–226° C.

EXAMPLE 2

MICROBIAL CONVERSION

Preparation of Slant Cultures

A distilled water suspension of a lyophilized culture of *Aspergillus sclerotiorum* (from the Commonwealth Mycological Institute as CMI 56673, also known as IMI 56673) is inoculated on slants of agar medium containing amidex cornstarch, NZ amine type A, beef extract, yeast extract and cobalt chloride. After incubation at 28° C. for one week, 10 ml. of sterile distilled water is added to each of four selected slants, the spores and growth loosened, and the resulting mixtures added to the growth medium described below.

Preparation of Seed (Seed Stage)

The mixtures obtained from the slant cultures are added to a 30-liter fermentation vessel containing 12 liters of a sterile growth medium having the following composition:

| Ingredient: | Percent |
| --- | --- |
| Glucose monohydrate | 2.0 |
| Soybean meal (solvent extracted, 44% protein | 2.0 |
| Brewers yeast (U.S.P., Yeast Products Co.) | 0.5 |
| Sodium chloride | 0.5 |
| Dipotassium hydrogen phosphate (anhydrous) | 0.5 |
| Q.s. with tap water to 100 | |
| Adjusted to pH 6.4 with concentrated $H_2SO_4$ and sterilized by heating at 121° C. | |

The resulting growth medium mixture is aerated at ½ v.v.m., agitated at 200 r.p.m. and maintained at 30° C. for 40 hours to provide the first-stage seed.

Pre-conversion Stage

First-stage seed in the amount of 800 ml. is added to 16 liters of growth medium having the composition described above and the resulting mixture is aerated at ½ v.v.m., agitated at 200 r.p.m. and maintained at 30° C. for 28 hours in a 30-liter fermenter.

Conversion Stage

A solution of 6-chloro-4-methyl-1-(4-methyl-1-piperazinyl)-thioxanthen-9-one (8 g.) in 700 ml. of water is then added and the resulting mixture, aerated at ½ v.v.m., agitated at 240 r.p.m. and 30° C. for 24 hours. The resulting fermentation medium is filtered with diatomaceous earth. The filtrates from three of the above-converted fermenters are combined and also the three filter cakes. The combined filtrates and combined filter cakes are separately extracted with methylene chloride. The cake extract is concentrated in vacuo to syrup which crystallizes upon trituration with ethyl acetate. Recrystallization from a mixture of ethyl acetate and methanol gives 6-chloro-4-(hydroxymethyl)-1-(4-methyl-1-piperazinyl)thioxanthen-9-one as yellow crystals; m.p. 186°–188° C. A similar treatment of the extract from the fermentation filtrate yields an additional sample of the same product.

EXAMPLE 3 m-Chloroperbenzoic acid (1.22 g.) is added portionwise over 1 hour to a solution of 1.98 g. of 6-chloro-4-methyl-1-(4-methyl-1-piperazinyl)thioxanthen-9-one in 15 ml. of chloroform with stirring at room temperature. After stirring for 18 hours, the precipitate which forms is collected by filtration and stirred into 100 ml. of 1 N methanesulfonic acid. The cloudy solution is washed twice with 50 ml. portions of ether, treated with excess sodium hydroxide, and extracted three times with 50 ml. portions of chloroform. The chloroform extract is dried over potassium carbonate and concentrated in vacuo to dryness. Recrystallization of the residue from acetonitrile gives 6-chloro-4-methyl-1-(4-methyl-1-piperazinyl)thioxanthen-9-one, $N^4$-oxide, monohydrate as bright yellow crystals; m.p. 189° C. (dec.).

A mixture of 0.50 g. of 6-chloro-4-methyl-1-piperazinyl)thioxanthen-9-one, 0.75 ml. of 30% hydrogen peroxide, and 10 ml. of acetone is heated under reflux for 11 hours. An additional 0.75 ml. of 30% hydrogen peroxide is added and refluxing is continued for 4 additional hours. The resulting solution is chilled, diluted with water, and the precipitate collected by filtration. Recrystallization from acetonitrile gives the desired 6-chloro-4-methyl-1-(4-methyl-1-piperazinyl)thioxanthen-9-one, $N^4$-oxide, monohydrate with physical characteristics essentially identical to those of the product obtained from the m-chloroperbenzoic acid oxidation above.

EXAMPLE 4

A solution of 59 mg. of m-chloroperbenzoic acid in 1 ml. of chloroform is added to a solution of 100 mg. of 6-chloro-4-(hydroxymethyl)-1-(4-methyl-1-piperazinyl)-thioxanthen-9-one in 3 ml. of chloroform. After stirring one hour at room temperature, the resulting precipitate is collected by filtration and stirred into 10 ml. of 1 N-methanesulfonic acid. The cloudy solution is washed twice with 5 ml. portions of ether, and treated with excess sodium hydroxide. The resulting precipitate is collected by filtration, washed with water, and dried. Recrystallization from methanol gives 6-chloro-4-(hydroxymethyl)-1-(4-methyl-1-piperazinyl)thioxanthen-9-one, $N^4$-oxide, sesquihydrate as yellow crystals; m.p. 234° C. (dec.).

We claim:

1. A member selected from the group consisting of a free base having the formula

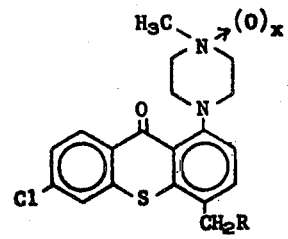

and its pharmaceutically acceptable acid addition salts; where R is H or OH and x is zero or one.

2. A compound according to claim 1 which is 6-chloro-4-methyl-1-(4-methyl-1-piperazinyl)thioxanthen-9-one.

3. A compound according to claim 1 which is a hydrochloride salt of 6-chloro-4-methyl-1-(4-methyl-1-piperazinyl)thioxanthen-9-one.

4. A compound according to claim 1 which is a methanesulfonate salt of 6-chloro-4-methyl-1-(4-methyl-1-piperazinyl(thioxanthen-9-one.

5. A compound according to claim 1 which is 6-chloro-4-(hydroxymethyl)-1-(4-methyl-1-piperazinyl)-thioxanthen-9

6. A compound according to claim 1 which is 6-chloro-4-methyl-1-(4-methyl-1-piperazinyl)thioxanthen-9-one, $N^4$-oxide.

7. A compound according to claim 1 which is 6-chloro-4-(hydroxymethyl)-1-(4-methyl-1-piperazinyl)-thioxanthen-9-one, $N^4$-oxide.

* * * * *

UNITED STATES PATENT AND TRADEMARK OFFICE
CERTIFICATE OF CORRECTION

PATENT NO. : 3,904,631
DATED : September 9, 1975
INVENTOR(S) : EDWARD F. ELSLAGER and DONALD F. WORTH It is certified that error appears in the above-identified patent and that said Letters Patent are hereby corrected as shown below:

In the Abstract, line 4 below the formula, the second "of" in the line should be deleted.

Column 3, line 62, delete the word "to" and insert:

--for--.

Column 4, line 13, the word "test" should be changed to

--tests--.

Column 5, line 64, the words

--(4-methyl-1- -- should be inserted before "piperazinyl)".

Column 6, last line of claim 5, after "thioxanthen-9"

insert

-- -one --.

Signed and Sealed this twenty-seventh Day of January 1976

[SEAL]

Attest:

RUTH C. MASON
Attesting Officer

C. MARSHALL DANN
Commissioner of Patents and Trademarks